(12) United States Patent
Verma

(10) Patent No.: US 11,093,615 B2
(45) Date of Patent: Aug. 17, 2021

(54) METHOD AND COMPUTER WITH PROTECTION AGAINST CYBERCRIMINAL THREATS

(71) Applicant: Siemens Aktiengesellschaft, Munich (DE)

(72) Inventor: Amit Verma, Taufkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/491,828

(22) PCT Filed: Feb. 13, 2018

(86) PCT No.: PCT/EP2018/053532
§ 371 (c)(1),
(2) Date: Sep. 6, 2019

(87) PCT Pub. No.: WO2018/162183
PCT Pub. Date: Sep. 13, 2018

(65) Prior Publication Data
US 2020/0372155 A1     Nov. 26, 2020

(30) Foreign Application Priority Data

Mar. 9, 2017 (EP) .................................... 17160155

(51) Int. Cl.
*G06F 21/50* (2013.01)
*G06F 21/70* (2013.01)
(Continued)

(52) U.S. Cl.
CPC ............ *G06F 21/568* (2013.01); *G06F 21/53* (2013.01); *G06F 21/577* (2013.01); *G06F 21/629* (2013.01); *G06F 21/74* (2013.01)

(58) Field of Classification Search
CPC . G06F 21/62; G06F 21/70; H04L 9/32; H04L 9/3228
See application file for complete search history.

(56) References Cited

U.S. PATENT DOCUMENTS

| | | |
|---|---|---|
| 2010/0024035 A1 | 1/2010 | Wallace |
| 2011/0289308 A1 | 11/2011 | Sobko et al. |
| 2015/0047046 A1* | 2/2015 | Pavlyushchik ..... H04L 63/1433 726/25 |

FOREIGN PATENT DOCUMENTS

| | | |
|---|---|---|
| CN | 102043927 | 5/2011 |
| CN | 102164148 | 8/2011 |

(Continued)

OTHER PUBLICATIONS

PCT International Search Report and Written Opinion of International Searching Authority dated Jun. 28, 2018 corresponding to PCT International Application No. PCT/EP2018/053532 filed Feb. 13, 2018.

(Continued)

*Primary Examiner* — Izunna Okeke
(74) *Attorney, Agent, or Firm* — Cozen O'Connor

(57) ABSTRACT

A method and a computer for protecting a computer, particularly an industrial automation component, against cybercriminal threats, wherein application programs are installed on the computer, different application programs being required for different functions of the computer, where at least two security stages are defined, such that for each security stage, functions are defined that are either undeactivatable in the event of cybercriminal threats to the functions and/or deactivatable in the event of cybercriminal threats to the functions, where identified functions and modules are selected which are allowed to be deactivated, and where selected modules are blocked, and functions are deactivated such that it is possible to dynamically deactivate (Continued)

optional software modules depending on cybercriminal threats and security stage of the computer to thereby constantly and optimally adapt the usable functional scope of the computer to a threat location and applicable respective operating conditions.

13 Claims, 2 Drawing Sheets

(51) Int. Cl.
*G06F 21/56* (2013.01)
*G06F 21/53* (2013.01)
*G06F 21/57* (2013.01)
*G06F 21/62* (2013.01)
*G06F 21/74* (2013.01)

(56) References Cited

FOREIGN PATENT DOCUMENTS

| CN | 102215229 | 10/2011 |
| CN | 103020526 | 4/2013 |
| CN | 103237118 | 8/2013 |
| CN | 105243329 | 1/2016 |
| EP | 1564623 | 8/2005 |
| WO | WO2015/076790 | 5/2015 |

OTHER PUBLICATIONS

Office Action dated Jun. 4, 2020 issued in Chinese Patent Application No. 201880016942.5.

* cited by examiner

METHOD AND COMPUTER WITH PROTECTION AGAINST CYBERCRIMINAL THREATS

CROSS-REFERENCE TO RELATED APPLICATIONS

This is a U.S. national stage of application No. PCT/EP2018/053532 filed Feb. 13, 2018. Priority is claimed on EP Application No. 17160155 filed Mar. 9, 2017, the content of which is incorporated herein by reference in its entirety.

BACKGROUND OF THE INVENTION

1. Field of the Invention

The invention relates to a method for protecting a computer against a cybercriminal threat, and to the computer having protection against the cybercriminal threats.

2. Description of the Related Art

Computers of all types which are connected to a data network and, in particular, to the Internet in this case are conventionally equipped with protective measures against cybercriminal threats. Cybercriminal threats are known in multiple forms, in particular as computer viruses, computer worms, Trojan horses, backdoors, spyware, scareware, or ransomware. These different threats are often also combined under the umbrella term "malware".

The threats or attacks mentioned often relate to individual programs, routines, dynamic link libraries or other executable program code that shall be subsumed under the umbrella term "modules" below. Such modules may have corresponding security gaps that are sometimes also called "exploits". As soon as such security gaps become known or malware specialized thereto becomes available, the affected computers are exposed, from experience, to an increased number of attacks that attempt to exploit these gaps.

In industrial automation arrangements, the data devices used there, in particular the programmable logic controllers, were not connected to the Internet in the first product generations, i.e., they were operated, as it were, in isolated data operation, with the result that only a few or no protective measures were provided for threats "from the outside"; only local protective measures such as access protection via passwords etc. were provided. With the widespread introduction of networked automation systems, the Industrial Internet of Things (IIoT), which is often also summarized under the umbrella term "Industry 4.0", the industrial automation arrangements (ICS—industrial control systems) are also increasingly exposed to cybercriminal threats. Consequently, protective measures against such threats are also provided for the industrial components.

With respect to "vulnerable" software or modules, it is often not sufficient to change settings in firewalls or other filters, but rather the only measure is often the deactivation or uninstallation of the affected modules until an improved version of the modules is available and can be installed. The increased use of protective measures, which increases the security against cybercriminal threats or "malware", is typically at the expense of performance and operating comfort (usability) of a computer in general and of an industrial automation system in particular. With respect to the deactivation of modules, this means that the application programs and the parts of an operating system that use such a module are no longer available and the corresponding functions provided with the programs or operating system modules are no longer available, which entails corresponding limitations in functionality and comfort. On the other hand, however, important core functions cannot or must not be switched off and deactivation of security-critical modules is therefore occasionally not possible or is at least associated with unacceptable losses in the usability of a computer. This therefore results in the protective or defensive measures, which are provided for a computer in the industrial environment, always constituting a compromise between risk protection (security level), on the one hand, and applicability (performance, usability, comfort), on the other hand.

The disadvantage of this is that neither the performance/usability/comfort nor the security is often set in an optimum manner, as a result of the compromise to be chosen.

The problem was often solved in the past by virtue of complicated measures, such as the uninstallation of attackable or "vulnerable" software, and other measures being manually controlled and performed only when a deliberate threat became known, for example, via media or other messages.

However, such an approach is only reactive, i.e., particular measures have often been taken only a long time after observing and registering a specific threat or a specific attack, and is also not very selective because entire program packages have often been uninstalled "as a precaution".

SUMMARY OF THE INVENTION

In view of the foregoing, it is therefore an object of the present invention to select the protective measures to be used on a computer against cybercriminal threats in a faster, simpler and more accurate manner.

A core idea of the inventive solution to the problem is to manage a number of security levels ("security settings") for a computer and, in this sense, in particular, for a component of an industrial automation arrangement (industrial control system—ICS), where the security levels each define which functions of the computer or of the automation arrangement or of the affected computer-controlled automation component are indispensable in the respective security level and which functions are optional, i.e., can possibly be deactivated. The application programs and the parts of the operating system that provide the respective functions or functionalities consist of individual modules in this case, in particular executable programs, program parts or dynamic link libraries (DLLs), where the individual modules may also each form part of a plurality of application programs and a plurality of parts of the operating system. If one of the modules is found to be at risk by virtue of a security warning, for example, being published with respect to the corresponding module, this module and therefore the affected application program or the affected part of the operating system are intended to be deactivated in accordance with the invention only if a functionality that is indispensable under the currently applicable security level is not affected thereby. In the case of a strict security level, this applies, for example, only to those functions that correspond to a core functionality that must not fail under any circumstances. In the case of a lower security level that can apply, for example, in the case of a system test or in the case of less important units, advanced functions, in particular comfort functions, can be blocked against deactivation, with the result that such comfort functions and other functions are then not deactivated either even in the event of a threat. As a result, it is possible to control the loss of functionality or comfort which occurs in the event of a threat on the basis of a security level.

These and other objects and advantages are achieved in accordance with the invention by a computer and a method for protecting a computer, in particular an industrial automation component, against a cybercriminal threat, where a number of application programs are installed on the computer, where the application programs each consist of a number of modules, in particular DLLs and other executable program modules, and wherein different ones of the application programs and therefore modules are required for different functions of the computer. Here, at least two security levels are defined for the computer, where those functions that must not be deactivated in the event of a relevant cybercriminal threat and/or those functions that can be deactivated in the event of a relevant cybercriminal threat are defined for each of the security levels, where, based on information relating to a current cybercriminal threat for at least one of the affected modules, the affected functions are identified, where, based on the current security level, those functions and modules of the identified functions and modules which can be deactivated are selected, and where the selected modules are blocked and the affected functions are deactivated. As a result, it is possible to disconnect dynamically optional software modules based on a respective cybercriminal threat and based on a security level of the computer, as a result of which the usable range of functions of the computer can always be adapted in an optimum manner both to a threat situation and to respectively applicable operating conditions.

It is also an object of the invention to provide a computer, in particular an industrial automation component, having protection against cybercriminal threats, where the application programs each consist of a number of modules, in particular DLLs and other executable program modules, and where different ones of the application programs and therefore modules are required for different functions of the computer. Here, at least two security levels are defined for the computer, where those functions that must not be deactivated in the event of a relevant cybercriminal threat and/or those functions that can be deactivated in the event of a relevant cybercriminal threat are defined for each of the security levels, and where the computer is configured to receive information relating to a current cybercriminal threat for at least one of the affected modules and to identify the affected functions based on this information, where, based on the current security level, those functions and modules of the identified functions and modules that can be deactivated are selected, and where the selected modules are blocked and the affected functions are deactivated. The same advantages as have already been described with respect to the method can be achieved via such a computer.

The method is advantageously used if the same module is used by different application programs and/or the operating system of the computer and is thus needed to provide a plurality of different functions of the computer. In such cases, a check is advantageously performed to determine whether a module affected by a threat is used in at least one function that cannot be deactivated or in the application programs and/or operating system parts associated therewith. If this is the case, then the module itself cannot be deactivated or uninstalled, but those functions, and therefore the application programs or operating system parts associated with the functions, for which deactivation is allowed under the currently applicable security level can be advantageously deactivated. Although the affected module itself is therefore not removed or deactivated, its use is restricted, as a result of which, although the vulnerability of the entire computer based on the module cannot be completely eliminated, it can be reduced.

In many cases, the modules are available in different versions or releases, in which case not every version or release is equally vulnerable or has security deficiencies. In such cases, it is advantageous if the information relating to the cybercriminal threats for the modules is also used to provide and consider information relating to the specifically affected versions or releases of the corresponding modules. The modules and the corresponding application programs, operating system parts and functions resulting therefrom are deactivated in accordance with the invention only when a critical version of the module is installed. In such cases, a newer version, which is possibly not at risk, of the module is searched for, in particular in a network or on a manufacturer site of the corresponding module, and the installed, security-critical module is possibly replaced with a better version.

In a similar manner to the functions on the application level that are provided by corresponding application programs and wherein the application programs can contain different modules, these or other modules may simultaneously also be part of the operating system. In such cases, corresponding functionalities of the operating system can also be deactivated in the event of vulnerability of the relevant modules provided that this is not a core functionality and provided that the corresponding functionality is not indispensable according to the respectively applicable security level. A definition of a security level can therefore advantageously also comprise corresponding functions of a modular operating system. A corresponding situation applies to functions of the computer that are formed both by parts of the operating system and by application programs.

The reaction to the realization that a module that is operating is affected by a cybercriminal threat can result in different reactions, where the reaction can also depend on a security level. For example, it is possible, in less critical situations, to only deactivate the corresponding module, that is to no longer use it. However, it can also be indicated to mark the corresponding module as critical by changing the file name or appending a corresponding comment to the filename, for example. It is also possible to shift such a module to a separate memory area, i.e., copy it to a separate area of a hard disk, for example, or to render the program code of the module non-executable by encrypting the program code, for example. If it emerges later that the threat to the module no longer exists because corresponding filters in a firewall have been connected or other measures have been taken, for example, these measures can be reversed again. It is also possible to reverse the corresponding measures if a security level that makes it necessary to activate the module again, for example, is subsequently changed over. It goes without saying that it is useful, for such situations, to avoid definitively deleting the affected module from the affected machine. Conversely, it is also possible to mark a module, which must be operated further on account of a current security level, as affected or to enter a corresponding reservation in a reservation memory, with the result that it is possible to check again, directly after a change in the security level, whether the affected module cannot or must not be disconnected or deactivated.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

One exemplary embodiment of the method according to the invention is explained below on the basis of the drawing. The example is simultaneously used to explain a computer in accordance with the invention, in which.

DETAILED DESCRIPTION OF THE EXEMPLARY EMBODIMENTS

Figure 1:
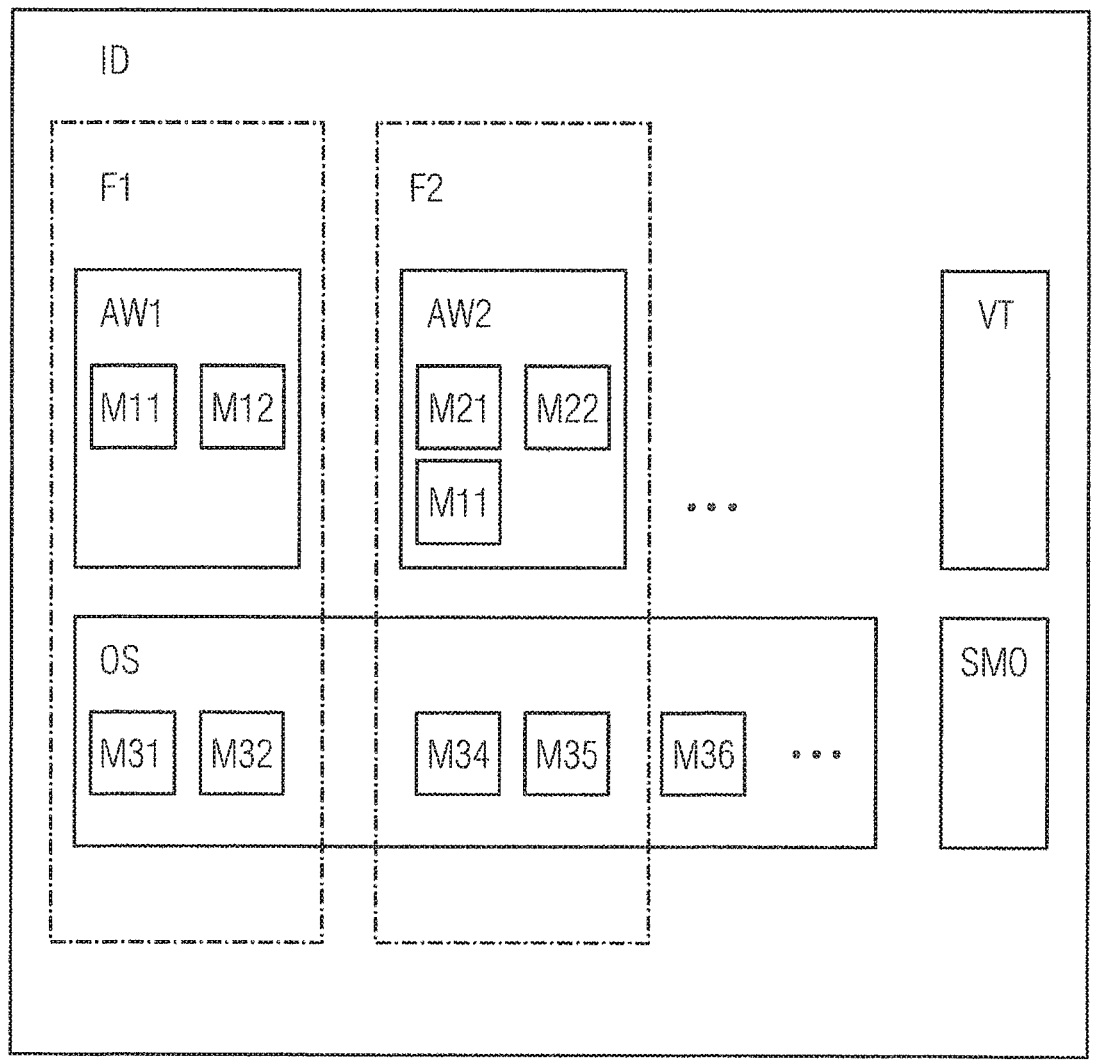
FIG. 1 shows, in a schematic illustration, a computer (industrial component) that is equipped with a plurality of modular application programs and a modular operating system and has devices for performing the method in accordance with the invention.

In this case, FIG. 1 shows, in a schematic illustration as a computer, an industrial automation component having different modules (software modules) and devices for carrying out the method in accordance with the invention.

With reference to FIG. 1, shown therein is a computer ID (industrial device) on which an operating system OS and two application programs AW1, AW2 are installed. In this simplified example, the operating system OS and the application programs AW1, AW2 substantially consist of modules M11, . . . , M36, where these modules M11, . . . , M36 are, for example, dynamic link libraries (DLLs), executable files ("Excel files"), scripts or other executable program code. The computer ID also has a threat register unit VT (vulnerability tracker) and a security controller SMO (security mode orchestrator).

It shall be assumed that the computer ID has different functions F1, F2, where each of the functions F1, F2 uses a number of the application programs AW1, AW2 and therefore a number of the modules M1, . . . , M36 to perform the corresponding functions F1, F2. The functions F1, F2 simultaneously also use particular parts of the preferably modular operating system OS. The same module M11, . . . , M36 can be used by a plurality of applications AW1, AW2 and simultaneously or alternatively also by the operating system OS. For the example, it can be assumed that the function F1 is an industrial control application that is used to control an industrial process or an industrial automation operation or the like. The function F2 may be, for example, an email program with which a user of the computer ID or one of the applications AW1, AW2 can communicate.

In the simplified exemplary embodiment in FIG. 1, only the modules M11, M12 are assigned to the application AW1, for example, whereas other modules M21, M22 are assigned to the application AW2. In addition, the application AW2 also accesses the module M11 that is also used by the application AW1. In this case, it is insignificant whether the module M11 is actually installed twice on the computer ID or is installed only once but is used by both application programs AW1, AW2.

Examples of modules M11, . . . , M36 may be, for example, an encryption module (for example, Open SSL) or a standard library (for example, glibc—GNU-C library).

Security vulnerabilities of software modules are typically regularly found and published by software developers or by organizations in the field of cyber security. Some threats are also listed in public directories (for example, national vulnerability database).

The computer ID illustrated in FIG. 1 exhibits two further modules, namely the threat register unit VT ("vulnerability tracker") and the security controller SMO ("security mode orchestrator").

The threat register unit VT keeps a list containing all modules M11, . . . , M36 that are used by the computer ID, i.e., by the application programs AW1, AW2 and preferably also by the operating system OS. The unit VT also observes or registers the information relating to cybercriminal threats ("vulnerabilities") that is available to these modules M11, . . . , M36. This list is updated as soon as a new module is added to the computer, for example, as the result of further functions (features) being installed. Conversely, the information kept in the list is also adapted if features or functions F1, F2 are uninstalled.

The threat register unit VT can regularly obtain information relating to modules M11, . . . , M36 that are conspicuous in terms of security, for example, from a manufacturer of the computer ID or the application programs AW1, AW2 or from one of the external databases that have already been described (for example, national vulnerability database). A user interface may also be provided, with the result that a user can manually input or edit threat information, or the like. In one embodiment, the unit VT can also automatically assign a security value or a threat value (criticality score) to the individual modules M1, . . . , M36, for example, based on the received information or based on its own observations, where its own observations determine, for example, a differing, in particular increased, communication behavior of the modules or unusual memory access operations of the modules. In principle, the threat register unit may have a statement relating to the degree of a current cybercriminal threat relating to each of the modules M11, . . . , M36. In one embodiment, the threat register unit VT may also receive or may already comprise instructions relating to the procedure that is intended to be used with a module at risk, for example, "uninstall" in the case of a high security risk and "restrict use" or "limit access to memory" or the like in the case of a moderate risk.

The security controller SMO (security mode orchestrator) implements a number of security levels for the computer ID, for example, security level S1 and security level S2. For each security level S1, S2, the controller SMO keeps a list containing those functions F1, F2, and therefore the corresponding modules M1, . . . , M35, which can be deactivated if the respective security level S1, S2 is valid, or conversely must not be deactivated. This list can also be adapted "online" by a manufacturer or a central administrator via a network. Manual adaptation via the optional user interface already mentioned is also possible. The security controller SMO has access to the information in the threat register unit VT. Based on this information, the security controller SMO decides which functions F1, F2 are affected by the current threats known for the modules M11, . . . , M36. Here, as an alternative to binary information (affected: yes or no), gradual values (threat level: x percent) can also be processed, in which case threshold values for deciding on the possible use of a module should then be defined. Depending on the currently set security level S1, S2, which possibly also each define their own threshold values, the security controller SMO then decides which functions with affected modules should be switched off, after which the security controller SMO asks the applications AW1, AW2 enabled for disconnection and the corresponding parts of the operating system OS to adjust operation and then ensures that the "vulnerable" modules are deactivated.

In an alternative embodiment, the security controller SMO can also additionally dynamically set the security level S2, S2 based on globally available cyber security information (cyber-security level indicator, such as Symantec Threatcon).

As an example, it can be assumed that the computer ID is an industrial control programmable logic controller (PLC) having an operating system OS and a control program as a function. The control program constitutes the core functionality of the control PLC. Furthermore, a user program on the control PLC can provide a further function that obtains alarms and events from the control program and sends them to an external email address of the user via encrypted email communication. This user program can use the known Open SSL module for encryption, for example.

It is also assumed that the described controller is operated in a production facility and all functions and programs of the control PLC are activated in a security level S1. It is also assumed that the user program that is set up to send encrypted emails constitutes an optional function and can be deactivated in a security level S2. It is noted that the security levels described here are arbitrarily selected and can be defined in a completely different manner in a practical implementation.

The steps which are implemented in order to perform the method on the computer ID are described below, in which case it shall be assumed here that the controller is operated with the security level S2.

In a first step, the threat register unit VT receives information relating to current threats which, in this exemplary embodiment, relate to the Open SSL module that is used to encrypt email communication.

In the next step, the security controller SMO receives a list containing modules (called L1 below) that have been marked as at risk in the threat register unit VT. These also include the above-mentioned Open SSL module.

In the next step, the security controller SMO decides, on the basis of the list L1, the list of functions (referred to as list F1 below) that operate with security-critical modules. These include the email service that uses the Open SSL module.

In the next step, the security controller SMO decides, based on the list F1 and based on the currently applicable security level (S2), which of the modules can be disconnected and stores this list, such as in a list F2.

In the next step, the security controller SMO asks the application programs and/or the operating system OS to deactivate the functions from the list F2. As a result, the application program for email communication is stopped and the affected modules at risk are then blocked or uninstalled, which also include the Open SSL module.

Based on this exemplary embodiment, it is therefore the case that, if a security-critical threat for the Open SSL module is determined, then the module is deactivated and/or uninstalled from the controller provided that the module is not required for a function which is indispensable under the current security level, i.e., a core functionality in this case. If, in the example shown, the Open SSL module were therefore also required for the core functionality of the control PLC, although the email functionality of the user program could be deactivated and the use of the Open SSL module could therefore be restricted, then the Open SSL module could not be completely deactivated or even uninstalled in this case. Here, the security-critical threat cannot be completely curbed by the currently vulnerable module, but can still be reduced by restricting the use of the module.

If a "security patch" is available and used to correct the Open SSL module at a later time and the threat for the control PLC is therefore eliminated, then the Open SSL module can be activated again and the full functionality of the control PLC can be restored.

In one advantageous embodiment, the computer ID and therefore one of the modules described, in particular the module SMO, can also actively search for a newer version of the Open SSL module, which is not at risk from the security gap, and can ensure that this new version is installed.

In principle, the above-described method is suitable for dynamically deactivating optional software modules, i.e., those that are not necessarily required for a particular operating mode or for a particular security level, or for putting them into quarantine or the like if a security-critical threat is known for the corresponding module.

The use of security updates and "security patches" and the updating of corresponding software parts is a complex operation that is generally, performed only rarely because such system maintenance is complicated and is often also associated with operational interruptions. From this case, many automation systems in the prior art have not been at a current security level for a relatively long time. This results in these systems being comparatively susceptible to security risks. With the advent of modern paradigms, such as the Industrial Internet of Things (IIoT), more and more automation systems and industrial computers that were previously still operated in isolation from the Internet are connected to the Internet. Such systems are particularly susceptible to cybercriminal threats as long as they are not up-to-date. The above-described method reduces the possibilities of attacking these formerly "unhardened" (unpatched) systems.

Figure 2:
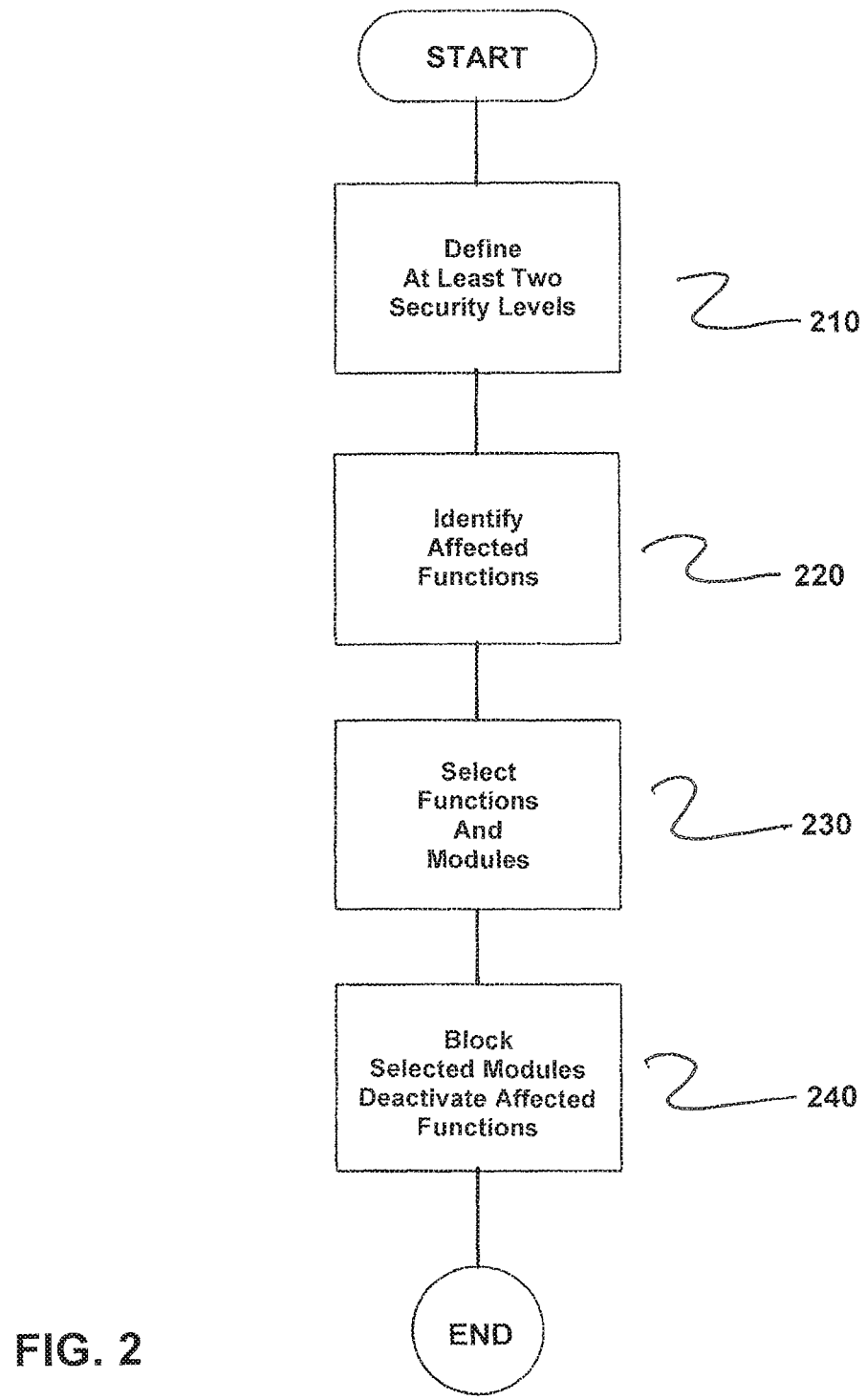
FIG. 2 is a flowchart of the method in accordance with the invention.

FIG. 2 is a flowchart of the method for protecting a computer ID against a cybercriminal threat, where a plurality of application programs AW1, AW2 are installed on the computer ID, each of the plurality of application programs AW1, AW2 consisting of a plurality of modules M1, . . . , M36, and where different ones of the plurality of application programs AW1, AW2 and therefore modules (M1, . . . , M36) being required for different functions F1, F2 of the computer ID. The method comprising defining at least two security levels for the computer ID, as indicated in step 210. Here, either those functions F1, F2 which must not be deactivated in the event of a relevant cybercriminal threat and/or those functions F1, F2 which are deactivatable in an event of a relevant cybercriminal threat for defined for each of the at least two security levels.

Next, affected functions F1, F2 are identified, based on information relating to the current cybercriminal threat for at least one affected module of the plurality of modules M1, . . . , M36, as indicated in step 220.

Next, those functions and modules of the identified functions F1, F2 and modules M1, . . . , M36 which are deactivatable are selected, based on the current security level, as indicated in step 230.

Next, the selected modules M1, . . . , M36 are blocked and the affected functions F1, F2 deactivated, as indicated in step 240.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for protecting a computer against a cybercriminal threat, a plurality of application programs being installed on the computer, each of said plurality of application programs consisting of a plurality of modules, and different ones of the plurality of application programs and therefore modules being required for different functions of the computer, the method comprising:
    defining within the computer at least two security levels for the computer, at least one of (i) those functions which must not be deactivated in the event of a relevant cybercriminal threat and (ii) those functions which are deactivatable in an event of a relevant cybercriminal threat for each of the at least two security levels being defined;
    identifying, based on information relating to a current cybercriminal threat for at least one affected module of the plurality of modules, affected functions;
    selecting, based on the current security level, those functions and modules of the identified functions and modules which are deactivatable; and
    blocking the selected modules and deactivating affected functions;
    wherein the computer is equipped with a modular operating system;
    wherein at least one of the operating system modules has one of the module of the of the plurality of modules;
    wherein the operating system modules are likewise assigned to the security levels; and
    wherein, in a similar manner to the plurality of modules for the plurality of application programs, the plurality of modules for the operating system modules are also identified and possibly deactivated or blocked in an event of a relevant cybercriminal threat.

2. The method as claimed in claim 1, wherein the same module is used by at least one of (i) different application programs and (ii) the operating system of the computer, the same module being needed to provide a plurality of functions of the computer.

3. The method as claimed in claim 1, wherein the plurality of modules are available in different versions or releases;
    wherein the information relating to the cybercriminal threats for the plurality of modules is also utilized to provide information relating to affected versions or releases of corresponding modules of the plurality of modules, and said information relating to the versions being compared with the information relating to a respectively installed version of a corresponding module of the plurality of modules; and
    wherein a corresponding function is deactivated and the corresponding module of the plurality of modules is blocked only in an event of correspondence.

4. The method as claimed in claim 3, wherein, after a module of the plurality of modules has been deactivated or blocked, another variant comprising a newer variant, of the module of the plurality of modules in a version or with a release which is not affected by a cybercriminal threat is automatically searched for, installed and activated, after which a corresponding function of the computer is possibly restored or activated.

5. The method as claimed claim 1, wherein the selected blocked modules are uninstalled, marked as being in quarantine or are shifted to a separate, protected memory area of the computer.

6. The method as claimed in claim 1, wherein the computer comprises an industrial automation component and the plurality of modules comprise at least one of (i) dynamic link libraries and (ii) other executable program code.

7. A computer having protection against cybercriminal threats, the computer comprising:
    a processor;
    memory;
    a plurality of application programs executed by the processor, each of the plurality of application programs consisting of a plurality of functional modules, different ones of said plurality of application programs and therefore modules being required for different functions of the computer;
    wherein within the computer at least two security levels are defined for the computer, at least one of (i) those functions which must not be deactivated in the event of a relevant cybercriminal threat and (ii) those functions which are deactivatable in an event of a relevant cybercriminal threat are defined for each of the security levels; and
    wherein the computer is configured to:
        receive information relating to a current cybercriminal threat for at least one of affected functional modules is received and identify affected functions based on said received information;
        select, based on a current security level, those functions and functional modules of identified functions and functional modules which are deactivatable;
        block selected functional modules and deactivate the affected functions;
    wherein the computer is equipped with a modular operating system;
    wherein at least one operating system module includes one functional module of the plurality of functional modules;
    wherein functionalities of the operating system modules are assigned to the security levels; and
    wherein, the computer is configured such that, in a similar manner to the plurality of functional modules for the application programs, the functional modules for the operating system modules are also identified and possibly blocked and the corresponding functionalities are deactivated in an event of a relevant cybercriminal threat.

8. The computer as claimed in claim 7, wherein the same functional module is utilized by at least one of (i) different application programs and (ii) the operating system of the computer, and the same functional module is needed to provide a plurality of functions of the computer.

9. The computer as claimed in claim 7, wherein the computer is further configured such that the plurality of functional modules are available in different versions or releases;
    wherein the information relating to the cybercriminal threats for the plurality of functional modules is also utilized to provide information relating to affected versions or releases of the corresponding functional modules of the plurality of functional modules, and said information relating to the versions is compared with information relating to a respectively installed version of a corresponding functional module of the plurality of functional modules; and wherein a corresponding function is deactivated and the corresponding functional module of the plurality of functional modules is blocked only in an event of correspondence.

10. The computer as claimed in claim 8, wherein the computer is further configured such that the plurality of functional modules are available in different versions or releases;

wherein the information relating to the cybercriminal threats for the plurality of functional modules is also utilized to provide information relating to affected versions or releases of the corresponding functional modules of the plurality of functional modules, and said information relating to the versions is compared with information relating to a respectively installed version of a corresponding functional module of the plurality of functional modules; and wherein a corresponding function is deactivated and the corresponding functional module of the plurality of functional modules is blocked only in an event of correspondence.

11. The computer as claimed in claim 9, wherein the computer is configured such that, after a functional module has been deactivated or blocked, another variant comprising a newer variant, of the functional module in a version or with a release which is not affected by a cybercriminal threat is automatically searched for, installed and activated, after which a corresponding function of the computer is possibly restored or activated.

12. The computer as claimed in claim 7, wherein the computer is configured such that blocked functional modules of the plurality of functional modules are uninstalled or are marked as being in quarantine or are shifted to a separate, protected memory area of the computer.

13. The computer as claimed in claim 7, wherein the computer comprises an industrial automation component and the plurality of functional modules comprise at least one of (i) dynamic link libraries and (ii) other executable program code.

* * * * *